United States Patent [19]

Barbieux

[11] Patent Number: 4,763,906
[45] Date of Patent: Aug. 16, 1988

[54] SYSTEM FOR THE RAPID CHANGE OF CLAMPING JAWS ON A MACHINE TOOL

[75] Inventor: Jacques Barbieux, Louvres, France
[73] Assignee: Sandvik Tobler S.A., Louvres, France
[21] Appl. No.: 884,634
[22] Filed: Jul. 11, 1986
[30] Foreign Application Priority Data Jul. 17, 1985 [FR] France .................. 85 10958

[51] Int. Cl.⁴ .................................. B23B 5/34
[52] U.S. Cl. ........................ 279/123; 279/1 SJ
[58] Field of Search .............. 279/1 B, 1 SJ, 110, 279/123

[56] References Cited

U.S. PATENT DOCUMENTS 4,026,566 5/1977 Rohm ............................ 279/123
4,667,971 5/1987 Norton et al. ............... 279/123 X

FOREIGN PATENT DOCUMENTS 2218637 10/1973 Fed. Rep. of Germany ...... 279/110
2949613 6/1981 Fed. Rep. of Germany ...... 279/110

Primary Examiner—Z. R. Bilinsky
Attorney, Agent, or Firm—Burns, Doane, Swecker & Mathis

[57] ABSTRACT

A quick clamping jaw change system comprises a blocking element on which a jaw is to be mounted. The blocking element carries a spring-biased pusher having an inclined pusher face which pushes against the jaw to displace the jaw against an inclined bearing face of the blocking member. Accordingly, the jaw slides along the bearing face to a locked position against the blocking element. The angle of inclination of the bearing face is larger than that of the pusher face so that the jaw cannot become dislodged unless the pusher is retracted against its spring bias.

7 Claims, 1 Drawing Sheet

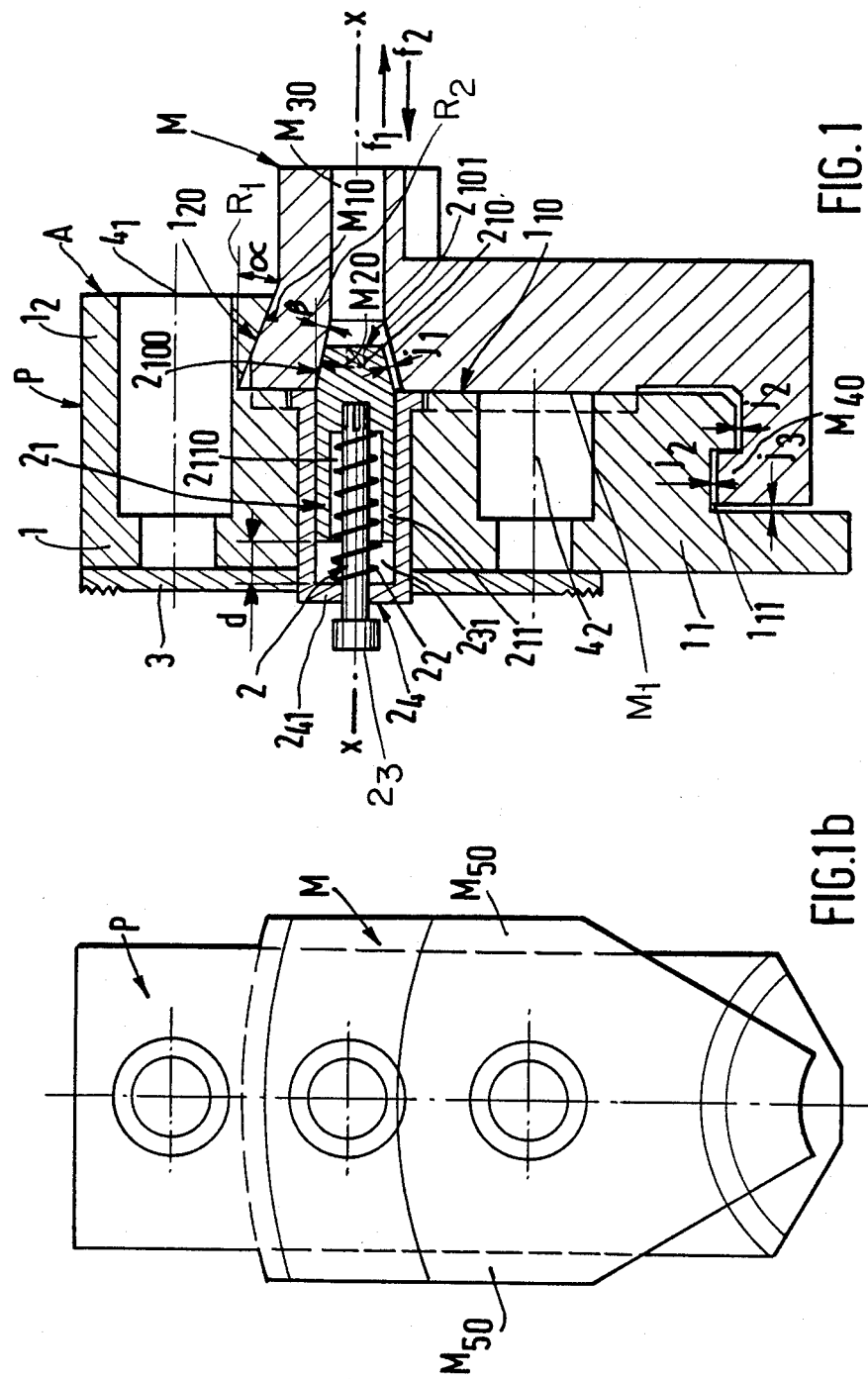

SYSTEM FOR THE RAPID CHANGE OF CLAMPING JAWS ON A MACHINE TOOL

BACKGROUND OF THE INVENTION

The present invention relates to a system for quickly changing clamping jaws on a machine tool, usable more particularly for repetitive machining operations.

Up to now, the jaws are mounted on the jaw holder by slow action fixing means, such as screws, bolts and similar devices. Removal of the jaws for removing the machined piece and replacement thereof by the piece to be machined is consequently a slow and expensive operation. In addition, the accuracy of clamping is often insufficient.

The present invention overcomes these drawbacks.

According to the invention, the system for quickly changing clamping jaws on a machine tool is characterized in that it includes locking means for self locking the jaws on the jaw holder, said means being essentially formed of a locking element having a base on one face of which said jaw rests in the locked position, and a bearing part for the jaws, the bearing face of said bearing part being inclined at an angle ($\alpha$) with a horizontal plane perpendicular to the plane vertical to said face of said base for cooperating in the locking position, with a corresponding bearing face of the jaw, on the one hand, and on the other, by at least one assembly for holding said jaw in the locking position, one of the ends of a mobile member of said assembly having at least one face inclined through an angle ($\beta$) with a horizontal plane perpendicular to the plane vertical to said face of said base for cooperating, in the locking position, with a corresponding bearing face of the jaw, said angles ($\alpha$) and ($\beta$) being open in the same direction, said angle ($\alpha$) being larger than said angle ($\beta$); said assembly further including means for unblocking and unlocking said jaw.

Said angle ($\alpha$) is from 1.5 to two times the angle ($\beta$) and the difference between the angles $$(\alpha)-(\beta)=7° \text{ to } 10°.$$

$$[\alpha=(1.4\div 2)\beta;\ \alpha-\beta=7°\div 10°].$$

The size of the angle ($\alpha$) is from 15° to 30°, and that of angle ($\beta$) from 7° to 20°.

Said means of said assembly for unblocking and unlocking said jaws include a pusher, one end of which having at least one inclined face may be in the form of a head or an end piece, and the other end of which allows an adjustable resilient means to be housed, against which said pusher may be pushed back into a bore formed directly or indirectly in said base of said element of the jaw holder, during the operation for unblocking and unlocking said jaw until the face of said end is the same level below the upper face of said base.

A bore is provided in the jaw giving access to the end situated on the jaw side of said pusher for the locking and unlocking operation.

Means for driving the jaw are provided.

These drive means are in the form of grooves disposed on each side of the jaw, or in the form of central keying between the jaw and the jaw holder;

Said drive means are in the form of a pusher which alone ensures the drive for the jaw, when the drive torque is low.

The jaw comprises a heel, which, during blocking and locking of the jaw on the jaw holder, is housed in a corresponding recess in the base of the element of the jaw holder.

The drawings Other advantages and characteristics will become apparent from the following detailed description of a preferred embodiment thereof in connection with the accompanying drawings, in which like numerals designate like elements, and in which:

FIG. 1 shows schematically by way of example, and in section, a jaw holder and a jaw in the blocked and locked position; and FIG. 1b shows a top view of the assembly shown in FIG. 1.

DESCRIPTION OF A PREFERRED EMBODIMENT OF THE INVENTION

As is shown in these Figures, the jaw holder P includes a blocking element 1, an assembly 2 for holding the jaw M in the blocked and locked position, and a toothed zone 3 for example on the lower face of element 1 for holding the jaw in position on the mandrel (not shown in the drawings), the jaw holder P being mounted on the mandrel by screws $4_1$, $4_2$.

Element 1 has a base $1_1$ and a bearing part $1_2$ for the jaw M. This bearing part $1_2$ is defined on the jaw M side by a bearing face $1_{20}$ inclined at an angle $\alpha$ relative to a horizontal plane $R_2$ disposed perpendicular to the vertical abutment face $1_{10}$ of said base $1_1$.

The assembly 2 is formed by a cylindrical liner $2_4$ mounted so as to pass through the base $1_1$ and the plate 3; one of the ends of said linear $2_4$ (on the left in the drawing) is closed by means of a cap $2_{41}$, a bottom or similar structure. Advantageously, the liner $2_4$ and the lid $2_{41}$ (at the bottom) are in the form of a single piece. An opening is formed in the center of the lid or bottom $2_{41}$ for allowing a screw $2_3$ to pass therethrough for adjusting a resilient means, for example a helical spring $2_2$. A distance is provided between the head of said screw $2_3$ and the outer face of the bottom $2_{41}$ as a locking compensation reserve.

Other types of adjustable resilient means may be used to resist movement of the pusher in the direction $f_2$ without departing from the scope of the invention. The spring $2_2$ bears, on the one hand, on the inner face of the bottom $2_{41}$ and, on the other hand, on the inner face of a bore $2_{110}$ formed in an external part $2_{11}$ of a pusher $2_1$ which moves over a distance d along the axis x—x in said liner $2_4$ either in the direction of arrow $f_1$ through the action of said resilient means $2_2$, or in the direction of arrow $f_2$ against said resilient means $2_2$. It is within the scope of the invention to replace said liner by a simple bore formed in the base $1_1$ and having an appropriate lid or bottom. The other end $2_{10}$ of pusher $2_1$ has at least one pushing face $2_{100}$ inclined at an angle ($\beta$) relative to a horizontal plane $R_2$ disposed perpendicular to the vertical face $1_{10}$ of the base $1_1$. In the example shown in the Figures, this end $2_{10}$ is conical. It may have a pyramidal shape or have the general shape of a prism with a single inclined face, without departing from the scope of the invention. The face $2_{101}$ of the end $2_{10}$ of the pusher $2_1$ comprises recesses or openings for allowing the action of a tool on the pusher $2_1$.

The two angles $\alpha$ and $\beta$ are open in the same direction; angle $\alpha$ is always greater than the angle $\beta$. The applicant has discovered that it is particularly advantageous if $\alpha=1.4$ to $2\times\beta$ and if the difference between $\alpha$ and $\beta$ is 7° to 10°. The angle $\alpha$ may vary between 15° to 30° and the angle $\beta$ may vary from 7° and 20°. In the example shown, $\alpha$ is about 20° and $\beta$ is about 12°.

The jaw M has at one of its ends an inclined bearing face $M_{10}$, the angle of inclination being equal to the angle $\alpha$. The other end of the jaw M has a heel $M_{40}$ which is housed in a recess $1_{11}$ formed in the base $1_1$ of the element 1. The jaw M has a face which rests against the face $1_{10}$ of the base 1 in the blocking and locking position. In that face an opening is formed having at least one reaction face $M_{20}$ inclined at an angle equal to the angle $\beta$. This opening includes a bore $M_{30}$ giving access to a tool for acting on the face $2_{101}$ of the end $2_{10}$ of the pusher $2_1$. The angles of inclination of the faces $M_{10}$ and $M_{20}$ are open in the same direction. In the example shown, the opening formed in the jaw M is conical. It may however, have any other form without departing from the scope of the invention provided that the face $M_{20}$ has the same inclination as the face $2_{100}$ of the pusher $2_1$. Similarly, in the Figures, the bearing face $1_{20}$ of the tool holder P and the corresponding face $M_{10}$ of the jaw M are circular, but these faces $1_{20}$ and $M_{20}$ may be flat or generally have any desired configuration without departing from the scope of the invention.

The operation of the system of the invention is as follows:

In the automatic blocking and locking position (shown in the figures), an abutment face M, of the jaw M rests on the abutment face $1_{10}$ of the tool holder P. The inclined faces $M_{10}$ and $M_{20}$ of the jaw M are in intimate contact with the inclined face $1_{20}$ of the blocking element 1 on the one hand and the inclined face $2_{100}$ of the end $2_{10}$ of the pusher $2_1$ under the action of a resilient means $2_2$ on the other hand. The difference in size between the angles $\alpha$ and $\beta$ ensures perfect application of the face $M_{10}$ of the jaw M against the bearing face $1_{20}$ of the jaw holder P and blocking and locking in the operating position by cooperation of the face $M_{20}$ of the jaw M and the face $2_{100}$ of the pusher $2_1$. Experience has shown that it is practically impossible to remove the jaw M without having previously carried out the unblocking and unlocking operation. In the example shown, difference in size between the angles $\alpha$ and $\beta$ results in the contact between the faces $M_{10}$ and $2_{100}$ being limited to an extremely narrow zone which may be a simple contact line. There then exists a clearance $j_1$ whose maximum size is reached at the position opposite said contact zone. The jaw is driven by grooves $M_{50}$ disposed on each of the sides of the sides of the jaw M and cooperating, in a way known per se, with the jaw holder P. When the drive torque is low, the pusher $2_1$ may alone be sufficient. A heel $M_{40}$ is provided at the inner end of the jaw M; it is housed, during operation, in a recess $1_{11}$ in the base $1_1$ of the jaw holder P; only one of these faces is in contact with a single face of the recess $1_{11}$ whereas clearances $j_2$ and $j_3$ exist between the other faces of the heel $M_{40}$ and the recess $1_{11}$. This arrangement may act against rocking of the jaw M and so prevent premature wear.

For unblocking and unlocking, a tool (not shown in the figures) is introduced manually or automatically through the bore $M_{30}$; this tool bears on the face $2_{101}$ of the pusher $2_1$ and pushes this back against the resilient means $2_2$ as far as said face $2_{101}$ or as far as the level of the face $1_{10}$ of the base $1_1$ of the jaw holder P or below this level. Jaw M is then free and may be removed manually or mechanically by means of nippers or equivalent means whch engage in one or more grooves disposed on the sides of jaw M.

For fitting the jaw M it is sufficient to introduce the jaw M on the jaw holder P so that the inclined face $M_{10}$ engages the corresponding inclined face $1_{20}$ of the jaw holder, and to press on the jaw until the pusher $2_1$ is engaged in the corresponding opening of the jaw; the pusher being movable along the axis x—x first of all against the resilient means $2_2$ in the direction of arrow $f_2$, and then, for locking, in the direction of arrow $f_1$ under the action of said resilient means $2_2$. Of course, with several jaws (in general at least three jaws) being used for holding a work piece, during machining, the unblocking and unlocking or blocking and locking operation may be effected either successively or simultaneously.

The invention allows considerable speed in the operation for removing and fitting jaws, and a very high repetitivity of the operation with extremely slow and low wear. Thus, in the case where the unblocking and unlocking tool is activated manually, the time for removing the jaws is of the order of six seconds and the time for refitting jaws (and the work piece to be machined) is of the order of about 10 seconds.

The accuracy of operation, after numerous operations, is never less than 1/100 mm (as a function of the dimensions of the work piece to be machined) in concentricity and excentricity of the work to be machined.

Numerous modifications and improvements may be made to the system of the invention without for all that departing from the scope of the invention. Thus, several pushers may be used for each jaw if that proves necessary.

The same system slightly modified may be used on machine tools such as planers, shapers, etc., the self-locking locking system may finally be used in technical fields other than the machine tool and machining fields.

I claim:

1. A quick clamping jaw change system for a machine tool, comprising:
    a blocking element having a first abutment face, and a first bearing face forming a first acute angle relative to a first reference plane disposed perpendicular to said first abutment face,
    a jaw mountable to said blocking element, said jaw comprising a second abutment face adapted to abut against said first abutment face, and a second bearing face adapted to bear against said first bearing face, said second bearing face angled correspondingly to said first bearing face, said jaw being movable in directions toward and away from said first abutment face and parallel to said first abutment face during insertion and removal of said jaw relative to the blocking element, said jaw including a reaction face forming a second acute angle relative to a second reference plane disposed parallel to said first reference plane, said second angle opening in the same direction as said first angle,
    a pusher mounted on said blocking element and including a pushing face angled correspondingly to said reaction face, said pusher being movable in a first direction relative to said blocking element toward said jaw such that said pushing face engages said reaction face and urges said second bearing face against said first bearing face to displace said jaw against said first abutment face,
    resisting means for resisting displacement of said pusher in a second direction opposite said first direction,
    said first angle being greater than said second angle so that said jaw can be moved away from said first abutment face only after said pusher has been disposed in said second direction.

2. A quick clamping jaw change system according to claim 1, wherein said resisting means comprises a spring yieldably urging said pusher in said first direction.

3. A quick clamping jaw change system according to claim 1, wherein said first angle is from 1.4 to 2 times as large as said second angle and the difference between said first and second angles is from 7 to 10 degrees.

4. A quick clamping jaw change system according to claim 3, wherein said first angle is from 15 to 30 degrees and said second angle is from 7 to 20 degrees.

5. A quick clamping jaw change system according to claim 1, wherein said pusher is movable in a direction parallel to said first and second reference planes, said pusher face formed on one end of said pusher, a resilient means arranged to yieldably bias said pusher in said first direction.

6. A quick clamping jaw change system according to claim 5, wherein said jaw includes an opening aligned with said pusher to enable a tool to be inserted through said opening for displacing said pusher away from said reaction face.

7. A quick clamping jaw change system according to claim 1, wherein said jaw includes a heel arranged to enter a recess in said blocking element.

* * * * *